US008380832B2

(12) United States Patent
DeLima et al.

(10) Patent No.: US 8,380,832 B2
(45) Date of Patent: *Feb. 19, 2013

(54) DYNAMIC HTTP LOAD BALANCING

(75) Inventors: Roberto DeLima, Apex, NC (US);
Craig A. Lanzen, Lambertville, MI (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/548,781

(22) Filed: Jul. 13, 2012

(65) Prior Publication Data
US 2012/0284387 A1    Nov. 8, 2012

Related U.S. Application Data

(63) Continuation of application No. 12/355,984, filed on Jan. 19, 2009, now Pat. No. 8,260,892, and a continuation of application No. 09/912,570, filed on Jul. 24, 2001, now Pat. No. 7,480,705.

(51) Int. Cl.
*G06F 15/177* (2006.01)
*G06F 15/173* (2006.01)
(52) U.S. Cl. .......... 709/222; 709/221; 709/226
(58) Field of Classification Search .......... 709/220–222, 709/226
See application file for complete search history.

(56) References Cited

U.S. PATENT DOCUMENTS

| 6,006,264 | A | 12/1999 | Colby et al. |
| 6,023,722 | A | 2/2000 | Colyer |
| 6,078,960 | A | 6/2000 | Ballard |
| 6,286,038 | B1 | 9/2001 | Reichmeyer et al. |
| 6,393,458 | B1 | 5/2002 | Gigliotti et al. |
| 6,412,079 | B1* | 6/2002 | Edmonds et al. ............... 714/11 |
| 6,560,717 | B1 | 5/2003 | Scott et al. |
| 6,804,710 | B1 | 10/2004 | Kawada et al. |
| 7,197,547 | B1 | 3/2007 | Miller et al. |
| 7,278,103 | B1* | 10/2007 | Clark et al. ............... 715/736 |
| 7,480,705 | B2 | 1/2009 | DeLima et al. |
| 2002/0129127 | A1 | 9/2002 | Romero et al. |
| 2003/0023669 | A1 | 1/2003 | DeLima et al. |
| 2003/0154279 | A1 | 8/2003 | Aziz |
| 2004/0024853 | A1* | 2/2004 | Cates et al. ............... 709/223 |
| 2006/0168224 | A1* | 7/2006 | Midgley ............... 709/226 |
| 2009/0125621 | A1 | 5/2009 | DeLima et al. |

OTHER PUBLICATIONS

Non-Final Office Action dated Nov. 10, 2004 for U.S. Appl. No. 09/912,570.
Final Office Action dated May 23, 2005 for U.S. Appl. No. 09/912,570.
Non-Final Office Action dated Dec. 5, 2005 for U.S. Appl. No. 09/912,570.
Final Office Action dated May 15, 2006 for U.S. Appl. No. 09/912,570.
Non-Final Office Action dated Dec. 4, 2006 for U.S. Appl. No. 09/912,570.
Non-Final Office Action dated Oct. 18, 2007 for U.S. Appl. No. 09/912,570.
Final Office Action dated Apr. 8, 2008 for U.S. Appl. No. 09/912,570.
Notice of Allowance dated Sep. 11, 2008 for U.S. Appl. No. 09/912,570.
Non-Final Office Action dated Apr. 22, 2010 for U.S. Appl. No. 12/355,984.
Final Office Action dated Sep. 17, 2010 for U.S. Appl. No. 12/355,984.
Notice of Allowance dated Jul. 3, 2012 for U.S. Appl. No. 12/355,984.

* cited by examiner

*Primary Examiner* — Patrice Winder
(74) *Attorney, Agent, or Firm* — Arthur J. Samodovitz

(57) ABSTRACT

The invention is a method and apparatus for facilitating facilitates load balancing in a server farm. In accordance with various aspects of the invention, all of the information about each server necessary for a load balancing program to define and execute a load balancing algorithm is stored at a predetermined URL for each server. The load balancer can query the predefined URL, which returns the necessary information. The load balancer then dynamically configures the load balancing algorithm in accordance with the returned information.

27 Claims, 2 Drawing Sheets

DYNAMIC HTTP LOAD BALANCING

CROSS REFERENCE TO RELATED APPLICATION

This patent application is a continuation of U.S. patent application Ser. No. 12/355,984 by Roberto DeLima entitled "Dynamic HTTP Load Balancing" filed Jan. 19, 2009 which is a Continuation of U.S. patent application Ser. No. 09/912,570 by Roberto DeLima entitled "Dynamic HTTP Load Balancing" filed Jul. 24, 2001.

FIELD OF THE INVENTION

The invention pertains to load balancing at a server farm in a distributed network. More particularly, the invention pertains to a method and apparatus for dynamically configuring a load balancing scheme.

BACKGROUND OF THE INVENTION

FIG. 1 is a block diagram illustrating the basic components of a communications network and particularly the components of a large scale server farm coupled to the network. For exemplary purposes, in FIG. 1, the network 114 is the Internet, however, the network may be any communication network. Information content on the Internet is presented via pages, each page comprising a file that is stored on (or dynamically built by) a computer server that is coupled to the Internet and assigned a uniform resource locator (URL), which is essentially an address. Servers such as servers 116b and 116c are computers that are end points of the network and whose general purpose is to provide (or serve) information to other computers coupled to the network. Those computers that are used to access information from servers via the network are typically termed client machines or client computers. Client machines are illustrated at 112a through 112e in FIG. 1.

In the case of the Internet and the World Wide Web (Web), client machines run programs called Web browsers that enable one to access and view Web pages by issuing requests for that information from a particular server. Such requests are routed through the Internet 114 to the server identified in the request (by its URL) and return the requested information (if available) to the requesting client machine 112 through the Internet 114.

A large-scale server farm is illustrated at 116a in FIG. 1. A server farm essentially is a plurality of servers that operate in conjunction with each other to collectively service requests. For instance, for a Web site operator, the number of requests from clients for information from its Web site may exceed the capacity of a single computing device (server) to service them all in a reasonable time frame. Accordingly, it may be necessary to distribute servicing of client requests among multiple servers in order to handle the amount of network traffic to that Web site. While FIG. 1 illustrates a typical configuration of a server farm 116a in which the various tasks are split up between multiple physical machines (computing devices), it should be understood by those of skill and the art that the term "server" has a broader meaning in the art. In its broader sense, a server is a software process running on a physical machine that serves content to clients in response to requests. It is not necessarily the case that each "server" is a separate machine. For instance, several Web servers can exist on a single machine as long specific ports are assigned to each server. However, for sake of simplicity, FIG. 1, illustrates a server farm in which each server is running on a separate physical machine.

The number of ways that a network operator or Web site operator can divide computing tasks among multiple servers is virtually limitless. However, there are two primary types of divisions of servers, namely, division among server groups and division among server clones within a server group. Usually, each server group contains one or more servers capable of handling a certain subset of tasks within the server farm. A server group comprises more than one server, wherein each server in the group is a clone of each other server in the group whereby each clone is equally capable of servicing a request. In FIG. 1, the server farm 116a is broken down into four server groups 118, 120, 122 and 124. Group 118 comprises a single front-end http server 118a which handles the front-end aspects of interfacing with the Internet and client machines and also determines to which of the other servers in the server farm any given request should be sent for servicing. A second server group 120 comprises servers 120a, 120b and 120c. Servers 120a, 120b and 120c are clones of each other. Accordingly, they all contain the same software, are capable of performing the same tasks, and have access to the same server farm resources.

For instance, let us assume that server farm 116a forms the Web site of a single, large-scale retailer and that server group 120 comprises an application server group. The application server group 120 performs tasks such as dynamically building Web pages responsive to requests received from clients surfing through the Web site and enabling the selection of goods for purchase. A second application server group 122 comprising server clones 122a and 122b which run a different set of applications and thus handle a second type of client requests. For example, when a person is finished shopping and is ready to "check out", the client requests corresponding to checking out after having selected items for purchase are handled by server group 122 which handles the back-end business tasks such as creating an invoice, creating a bill of lading, checking inventory to determine if the ordered items are in stock, checking credit card information to confirm validity and the availability of sufficient credit for the purchase, determining shipping costs and taxes, and calculating a total cost for the purchased items.

A third server group 124 comprises a database server 124a that stores data that may be needed by the other server groups to process requests. The database server 124a may store multiple databases such as a database of inventory, a database of the content that is used for dynamically building Web pages, a database for calculating taxes and shipping costs based on the shipping address, a database for maintaining session data, etc. In this example, there is only one database server, server 124a. However, if the traffic to and from the database server 124 is sufficiently high, it could also be a server group comprising two or more server clones in order to properly service the amount of traffic.

When a request is routed to server farm 116a via the Internet 114, the front-end http server 120 receives and parses the request in order to, among other things, determine to which application server the request should be dispatched for servicing. The URL or other information contained within a client request typically indicates the type of request e.g., check out) and thus will dictate to which server group in a server farm a particular request must be routed. The aforementioned is an example of the "content-based" aspect of routing a request to a particular, appropriate, server group in a server farm. Within a server group, however, a request can be serviced by anyone of the clones within that server group.

Accordingly, the front-end http server 120 also must also make a determination as to which server clone in the determined server group a request should be dispatched. Accordingly, a front-end http server such as server 120 typically will include a load balancer software module for choosing one of the multiple clones in a server group based on a multiplicity of factors.

One of the more important factors is the amount of traffic the individual server clones in the server group are currently handling. Commonly, it is desirable to distribute requests to servers within a server group such that each server clone handles approximately the same number of requests in a given time period so as to prevent one server from becoming over-loaded while another server is under-utilized. However, other considerations often factor into the load balancing scheme. For instance, during low traffic periods, the opposite may be desirable. That is, it may be desirable to turn off some of the servers that are not needed during periods of low traffic and just have one or a few of the servers running and servicing client requests. Further, some servers may fail partially or entirely, in which case the load balancer will need to adapt the load balancing scheme.

A server farm is a dynamic entity. Particularly, servers may be added to server groups, servers may be taken away from server groups, a series of tasks performed by a single server group may be split into two server groups, a server may go down unexpectedly, etc. In such events, the load balancer needs to be reconfigured in order to most effectively distribute client requests among the servers in the server farm. Accordingly, as the characteristics of the server farm change, the load balancer usually needs to be manually reprogrammed. Even if the load balancing software is sufficiently sophisticated to dynamically alter its algorithm in response to such changes, it at least needs to have the necessary information about each server in the farm manually input to it. such information might include time of day rules, whether the server is up or down, and health information about the server such as is commonly maintained in health URLs (as is well known to those of skill and the art).

Another parameter that is important to the load balancing algorithm is the session affinity rules applied at the server farm. Particularly, in many types of communication sessions between a particular client and a particular server system (i.e., Web site or server farm), it is desirable to associate multiple client request from a single client to a single Web site (or server farm) with each other so as to be able to maintain state information. For instance, at retail Web sites, which commonly use dynamically generated shopping cart pages to keep track of items being purchased by a particular client, maintaining state information is a necessity in order to keep track of the various products selected for purchase so that a shopping cart page correctly reflecting the items selected for purchase by the individual can be generated. Typically, each instant in which an individual selects another item for purchase will be contained in a different client request. Accordingly, the server system must have some mechanism for associating the different client requests from a given client with each other in order to properly add items to that individual's shopping cart page.

Countless other examples exist in which it is useful or necessary to associate a series of requests from a single client machine with each other and maintain state data for that series of related requests.

Many network applications, including those on the Internet, operate based on a session level protocol. Each message that makes up part of the session is exchanged in requests/response flows, and there are typically many messages exchanged. Each client request is transmitted from a client to a server using standard network protocols, and typically contain no information in the network protocol headers that relates that request to any other request in the session. Thus, in a session-based network application using standard network protocols, there is no provision in the network protocol headers that would allow a server (or client) to maintain session information about a series of related requests.

However, several ways have been developed for maintaining session information in a layer on top of the transfer protocol layer. One of the earliest mechanisms for maintaining session information was the use of cookies. As is well known to those of skill in the art of Web development, cookies are small pieces of data that a server sends to a client machine and that the client machine can thereafter include as part of requests to the same server (or server farm). A cookie can include information identifying a particular session to which the request belongs. The Java programming language also includes more advanced mechanisms such as the javax.servlet.http.HTTPSession object (commonly called HttpSession) for maintaining session information using cookies.

Although many schemes are possible and in use, typically, it is desirable in a server farm for all requests in a given session that are to be serviced by a given server group to be serviced by the same clone within that group. At least one of the reasons that this is beneficial is because, if different requests in a given session are serviced by different servers, then each of those servers must either build or be able to retrieve from a database the same session information. Reading and writing to a database for this purpose creates a substantial amount of additional traffic and overhead processing in the server farm.

Session affinity is a term used for describing rules for attempting to send different requests in a given session to the same server clone in a server group, when possible. Accordingly, the session affinity rules applied within a server farm also must be taken into account in developing a load balancing scheme.

Typically, the data items (parameters) needed by the load balancer to properly route requests to the most appropriate server are manually entered by a human operator. The variables typically take the form of cryptic alphanumeric codes which must be entered exactly for the load balancing software to recognize them. The task is tedious and error prone.

U.S. Pat. No. 6,006,264 discloses a method and system for directing flow between a client and a server that includes some automation of the process of feeding the load balancing algorithm with the necessary parameters for each server. Particularly, it discloses a scheme utilizing a module called an Intelligent Content Probe (ICP) that populates the load balancer with server and content information by probing servers for specific content relevant to load balancing that is not already stored in the load balancer.

It is an object of the present invention to provide an improved method for configuring a load balancer dynamically.

It is a further object of the present invention to provide an improved load balancing scheme.

It is yet another object of the present invention to provide an improved load balancer.

SUMMARY OF THE INVENTION

According to various aspects of the present invention, a method of configuring a load balancer for dispatching client requests in a server farm comprise initializing a load balancer by identifying address information for a plurality of servers in a server farm to the load balancer and individually polling each of the plurality of servers by the load balancer so as to obtain a configuration file from each polled server if available, where each obtained configuration file contains the parameters necessary to configure the load balancer for bringing the associated polled server on-line.

Polling is implemented by repeating for each of the plurality of servers, the steps of selecting by the load balancer, a next one of the plurality of servers and sending a request across a corresponding network from the load balancer to the next one of the plurality of servers for a configuration file corresponding to the next one of the plurality of servers, waiting for a reply from the next one of the plurality of servers, receiving either the corresponding configuration file or an error message from the next one of the plurality of servers, and validating parameters in the corresponding configuration file if received.

The method still further comprises configuring a load balancing algorithm by the load balancer in accordance with the parameters that were read out of each corresponding configuration file.

According to further aspects of the present invention, a computer program product to configure a load balancer for dispatching client requests in a server farm comprises a computer usable medium having computer usable program code embodied therewith, the computer usable program code comprising computer usable code to initialize a load balancer by identifying address information for a plurality of servers in a server farm to the load balancer and computer usable code to individually poll each of the plurality of servers by the load balancer so as to obtain a configuration file from each polled server if available. Each obtained configuration file contains the parameters necessary to configure the load balancer for bringing the associated polled server on-line.

Moreover, polling is implemented by repeatedly executing for each of the plurality of servers, computer usable code to select by the load balancer, a next one of the plurality of servers, computer usable code to send a request across a corresponding network from the load balancer to the next one of the plurality of servers for a configuration file corresponding to the next one of the plurality of servers, computer usable code to wait for a reply from the next one of the plurality of servers, computer usable code to receive either the corresponding configuration file or an error message from the next one of the plurality of servers, and computer usable code to validate parameters in the corresponding configuration file if received.

The computer program product still further comprises computer usable program code to configure a load balancing algorithm by the load balancer in accordance with the parameters that were read out of each corresponding configuration file.

According to still further aspects of the present invention, a load balancer for dispatching client requests in a server farm comprises a load balancer in data communication with a plurality of servers across a network connection. The load balancer has a processor and memory, wherein the processor is configured to receive address information for a plurality of servers in a server farm where each address is entered into the load balancer by a user. The processor is further configured to poll each of the plurality of servers so as to obtain a configuration file from each polled server if available, wherein each obtained configuration file contains the parameters necessary to configure the load balancer for bringing the associated polled server on-line.

Polling is implemented by repeatedly executing for each of the plurality of servers, selecting by the load balancer, a next one of the plurality of servers, sending a request across a corresponding network from the load balancer to the next one of the plurality of servers for a configuration file corresponding to the next one of the plurality of servers, waiting for a reply from the next one of the plurality of servers, receiving either the corresponding configuration file or an error message from the next one of the plurality of servers, and validating parameters in the corresponding configuration file if received.

The load balancer further configures a load balancing algorithm in accordance with the parameters that were read out of each corresponding configuration file.

DETAILED DESCRIPTION OF THE INVENTION

Figure 1:
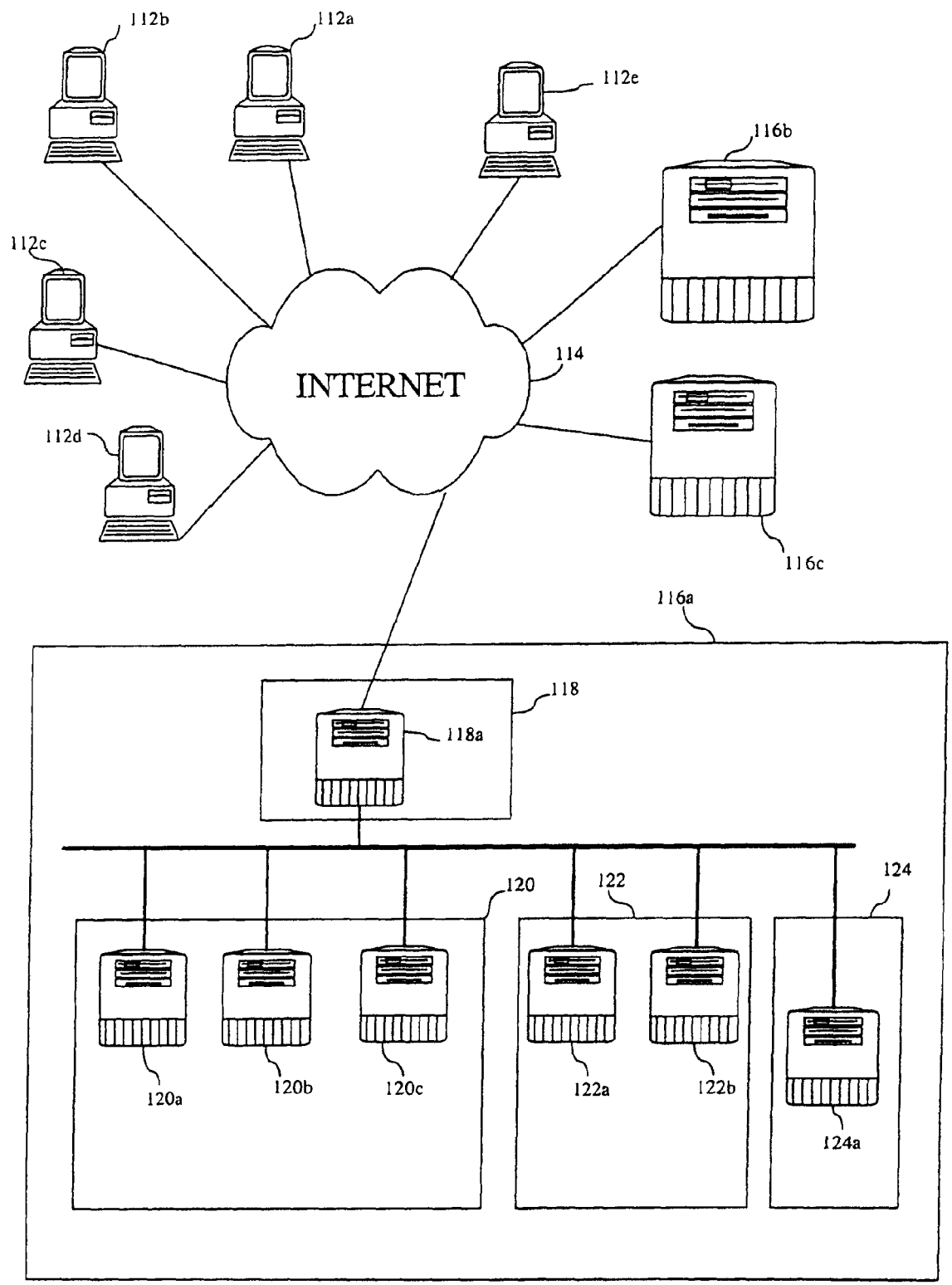
FIG. 1 is a block diagram of an exemplary server farm coupled to a distributed network.

In accordance with the invention, instead of an operator manually entering the variables for each server, the process is largely automated. The individuals items of data needed by the load balancer (parameters) will vary for different load balancing schemes. For instance, in a Web site having only one server group with each clone in that group being able to perform all tasks, the load balancer would not necessarily need to perform any content-based routing. Other factors that would affect the type and amount of data needed by the load balancer in order to perform load balancing include (1) session and or cookie affinity rules, if any applied at the server farm, (2) time of day rules, if any, applied at the server farm, (3) server health information, which is typically made available by polling of a health URL and (4) all content-based rules. The foregoing is merely exemplary and other possible variables would be well known to persons of skill in the art of Web development.

In accordance with the invention, all of the jewels needed by the load balancer are stored in a file, preferably in the data format used by the server farm for communications over the network to which it is coupled. For instance, in a Web server farm, the configuration files might be in HTML or XML format.

In at least one preferred embodiment, the health information remains in a separate health URL and the configuration file contains the health URL (i.e., the address of the file containing the health information, not the health information itself). The load balancer would then retrieve the file at the health URL in a separate GET operation after it determines the health URL from the configuration file.

Also in a preferred embodiment of the invention, each server contains the configuration file in its own memory having a path in accordance with a predefined standard. For instance, that standard path may be the server address in the server farm followed by the file name config.htm.

The invention has at least two major advantages. First, it eliminates the need for the operator of the load balancer to manually enter the information. This saves time and also reduces or eliminates errors in data entry. Secondly, the operator does not need to have in-depth knowledge of the Web site in order to properly configure the load balancer since the manufacturer of the server can provide the information needed by the load balancer within the memories of the servers when they are delivered to the Web site operator.

Either at predetermined intervals or in response to events that are either manually detected or automatically detected by the load balancer, the load balancer 210 can run a configuration (or reconfiguration) operation in which all of the configuration files are polled to retrieve all the variables used in defining the load balancing algorithm software 226. Examples of events that might be automatically detected by the load balancer 210 are a server going down, and instantaneous traffic volume at the server farm. Either of the above also might be manually detected. Examples of events that typically would be manually detected, but could be automatically detected, if desired, include the addition or removal of a server or server group from the server farm and/or the intentional bringing down of a server, such as may be necessary for routine and/or unscheduled maintenance.

Among clones, the variables in the configuration file will largely be the same. One notable exception is that the session affinity cookies will be unique to each server.

Figure 2:
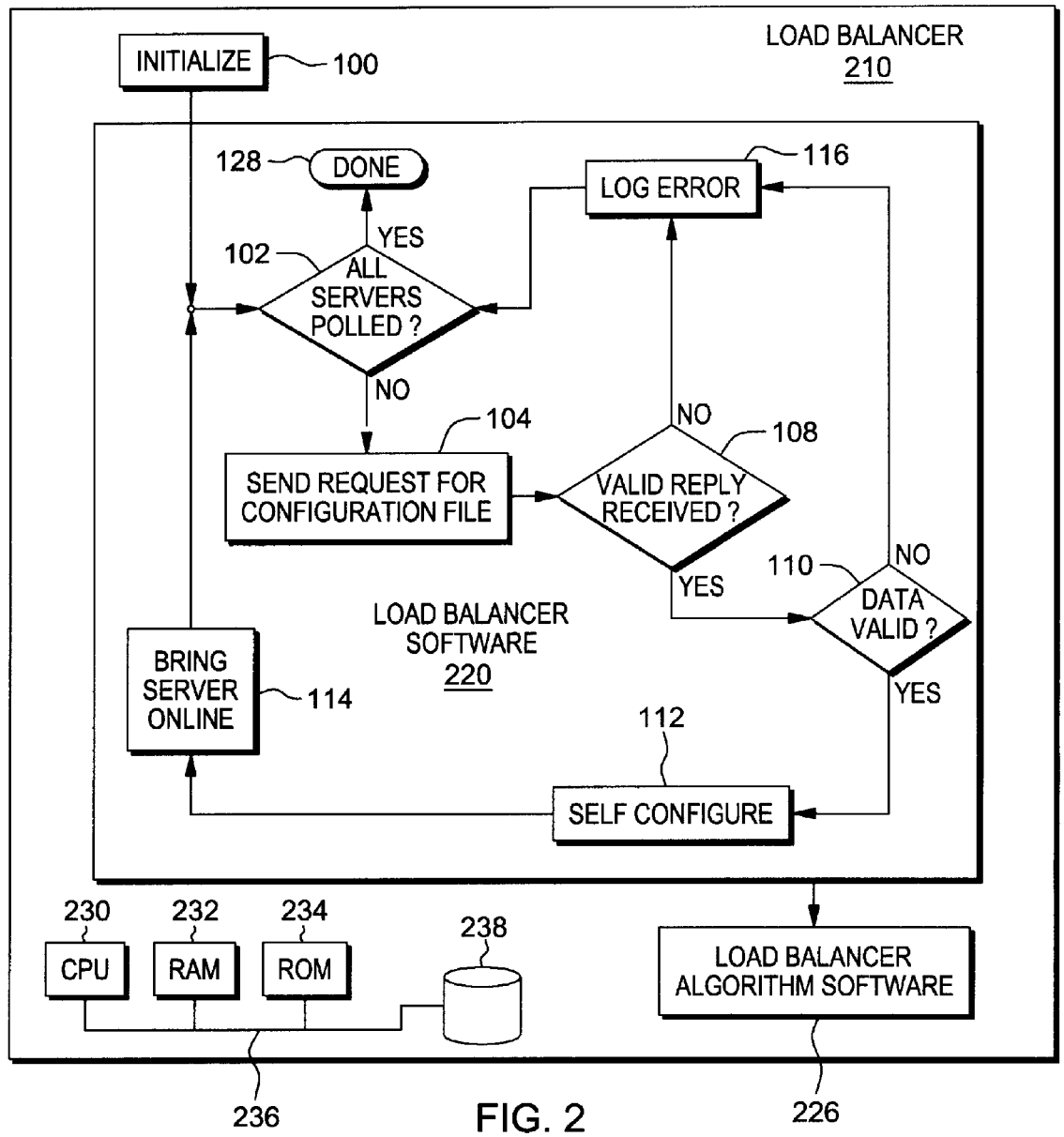
FIG. 2 is a flow diagram illustrating process flow in accordance with the present invention.

FIG. 2 is a flowchart illustrating a load balancing configuration/reconfiguration operation in accordance with at least one preferred embodiment of the present invention. It is merely exemplary and many other embodiments are possible and would be apparent those of skill and the art. In step 100, the load balancer software 220 is initialized by manually inputting the address information of all of the servers in the server farm. This includes their cluster address (their external Internet Protocol address) as well as the individual server addresses within the cluster. Flow then proceeds to step 102 where each server defined in the initialization process will be individually polled for its configuration file assuming there are servers that have not yet been polled, process flows from step 102 to step 104. Of course, after the last server has been polled, the process simply flows from step 102 to step 128 where the process is terminated.

In step 104, the load balancer software 220 sends an http request, for instance, "GET/_SVR_LB_.CFG HTTP/1.0", for the configuration file of the particular server which is being polled in this round, where "SVR_LB" is the particular server path.

The load balancer software 220 then waits for a reply. In step 108, it determines whether it received a proper reply or a "HTTP/1.0 404 not found" reply. If it receives a 404 reply, flow proceeds to step 116 where the load balancer software 220 generates an error report and stores it in an error log in its memory. Flow then returns to step 104 to determine whether there are any other servers that need to be polled.

If, on the hand, the server returns a proper reply in step 108, flow proceeds to step 110, where the load balancer software 220 validates the received data. The validation process essentially can comprise checking whether the data is in the proper language and includes an expected minimum set of parameters. If the data is not valid, then flow proceeds to step 116, where error information is written to the error log. Flow then proceeds back to step 102 to determine whether there are any more servers which must be polled.

If, on the other hand, the data is validated in step 110, flow proceeds to step 112. In step 112, the load balancer software 220 configures its load balancing algorithm software 226 in accordance with the parameters that were read out of the configuration file for that particular server. Flow then proceeds to step 114, where that server is brought on line. step 114 is not necessarily a function of the load balancing software 220. Nevertheless, it is shown in the flow chart for sake of completeness. Load balancer 210 also includes a CPU 230, RAM 232 and ROM 234 and bus 236, and a disk storage 238 coupled to the bus. Load balancer software 220 and load balancing algorithm software 226 are stored on disk storage 238 for execution by CPU 230 via 232.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A method for configuring a load balancer to dispatch client requests to servers in a cluster, the method comprising the steps of:
    a load balancer detecting that a set of servers currently in the cluster is insufficient to satisfy current demand for one or more applications executing in the set of servers, and in response,
    the load balancer individually polling, via one or more networks, each of a plurality of other servers that are not currently in the cluster to obtain respective configuration files containing parameter data to configure a load balancing algorithm in the load balancer to add the plurality of other servers to the cluster; and
    the load balancer configuring the load balancing algorithm to add the plurality of other servers to the cluster based on the respective parameter data obtained from the configuration files for the plurality of other servers.

2. The method of claim 1 wherein the load balancer detects that the set of servers currently in the cluster is insufficient to satisfy current demand for one or more applications executing in the set of servers based on a volume of requests to the servers in the cluster.

3. The method of claim 1 wherein the load balancer detects that the set of servers currently in the cluster is insufficient to satisfy current demand for one or more applications executing in the set of servers based on response time of the servers in the cluster.

4. The method of claim 1 wherein the load balancer detects that the set of servers currently in the cluster is insufficient to satisfy current demand for one or more applications executing in the set of servers based in part on deactivation of one or more of the servers in the cluster.

5. The method of claim 1 wherein the parameter data for each of the plurality of other servers identifies one or more applications installed in the respective other server, and the load balancer configures the load balancing algorithm to dispatch client requests to each of the plurality of other servers based on identities of applications installed in the respective other server.

6. The method of claim 5 wherein the parameter data for a first one of the plurality of other servers identifies a first application but not a second application installed in the first other server, and the parameter data for a second one of the plurality of other servers identifies the second application but not the first application installed in the second other server, and based on the parameter data for the first and second other servers, the load balancing algorithm dispatches requests for the first application to the first other server but not the second other server and dispatches requests for the second application to the second other server but not the first other server.

7. The method of claim 1 wherein the parameter data for each of the plurality of other servers identifies a first address of health information for a first one of the other servers, and a second address of health information for a second one of the other servers, and based on the parameter data for the first and second other servers, the load balancer configures the load balancing algorithm to check the health of the first and second other servers at the first and second addresses, respectively.

8. The method of claim 1 further comprising the prior steps of:
   making an electronic record that the plurality of other servers are candidates to add to the cluster and including in the electronic record respective network addresses of the plurality of other servers; and
   the load balancer identifying the plurality of other servers and the addresses of the plurality of other servers from the electronic record to determine which servers to poll and the respective addresses of the servers to poll in the step of the load balancer individually polling each of the plurality of other servers.

9. The method of claim 8 wherein the electronic record is made at the load balancer.

10. A computer program product for configuring a load balancing algorithm to dispatch client requests to servers in a cluster, the computer program product comprising:
   one or more computer-readable non-transitory storage devices and program instructions stored on at least one of the one or more storage devices, the program instructions comprising:
   program instructions to detect that a set of servers currently in the cluster is insufficient to satisfy current demand for one or more applications executing in the set of servers, and in response,
   individually poll, via one or more networks, each of a plurality of other servers that are not currently in the cluster to obtain respective configuration files containing parameter data to configure a load balancing algorithm to add the plurality of other servers to the cluster; and
   configure the load balancing algorithm to add the plurality of other servers to the cluster based on the respective parameter data obtained from the configuration files for the plurality of other servers.

11. The computer program product of claim 10 wherein the program instructions detect that the set of servers currently in the cluster is insufficient to satisfy current demand for one or more applications executing in the set of servers based on a volume of requests to the servers in the cluster.

12. The computer program product of claim 10 wherein the program instructions detect that the set of servers currently in the cluster is insufficient to satisfy current demand for one or more applications executing in the set of servers based on response time of the servers in the cluster.

13. The computer program product of claim 10 wherein the program instructions detect that the set of servers currently in the cluster is insufficient to satisfy current demand for one or more applications executing in the set of servers based in part on deactivation of one or more of the servers in the cluster.

14. The computer program product of claim 10 wherein the parameter data for each of the plurality of other servers identifies one or more applications installed in the respective other server, and the program instructions configure the load balancing algorithm to dispatch client requests to each of the plurality of other servers based on identities of applications installed in the respective other server.

15. The computer program product of claim 14 wherein the parameter data for a first one of the plurality of other servers identifies a first application but not a second application installed in the first other server, and the parameter data for a second one of the plurality of other servers identifies the second application but not the first application installed in the second other server, and based on the parameter data for the first and second other servers, the load balancing algorithm dispatches requests for the first application to the first other server but not the second other server and dispatches requests for the second application to the second other server but not the first other server.

16. The computer program product of claim 10 wherein the parameter data for each of the plurality of other servers identifies a first address of health information for a first one of the other servers, and a second address of health information for a second one of the other servers, and based on the parameter data for the first and second other servers, the program instructions configure the load balancing algorithm to check the health of the first and second other servers at the first and second addresses, respectively.

17. The computer program product of claim 10 further comprising:
   program instructions, stored on at least one of the one or more storage devices, to make an electronic record that the plurality of other servers are candidates to add to the cluster and including in the electronic record respective network addresses of the plurality of other servers; and
   program instructions, stored on at least one of the one or more storage devices, to identify the plurality of other servers and the addresses of the plurality of other servers from the electronic record to determine which servers to poll and the respective addresses of the servers to poll by the program instructions that individually poll each of the plurality of other servers.

18. The computer program product of claim 10 wherein the program instructions are installed in a load balancer.

19. A computer system for configuring a load balancing algorithm to dispatch client requests to servers in a cluster, the computer system comprising:
   one or more processors, one or more computer-readable memories, one or more computer-readable non-transitory storage devices, and program instructions stored on at least one of the one or more storage devices for execution by at least one of the one or more processors via at least one of the one or more memories, the program instructions comprising:
   program instructions to detect that a set of servers currently in the cluster is insufficient to satisfy current demand for one or more applications executing in the set of servers, and in response,
   individually poll, via one or more networks, each of a plurality of other servers that are not currently in the cluster to obtain respective configuration files containing parameter data to configure a load balancing algorithm to add the plurality of other servers to the cluster; and
   configure the load balancing algorithm to add the plurality of other servers to the cluster based on the respective parameter data obtained from the configuration files for the plurality of other servers.

20. The computer system of claim 19 wherein the program instructions detect that the set of servers currently in the cluster is insufficient to satisfy current demand for one or more applications executing in the set of servers based on a volume of requests to the servers in the cluster.

21. The computer system of claim 19 wherein the program instructions detect that the set of servers currently in the cluster is insufficient to satisfy current demand for one or more applications executing in the set of servers based on response time of the servers in the cluster.

22. The computer system of claim 19 wherein the program instructions detect that the set of servers currently in the cluster is insufficient to satisfy current demand for one or more applications executing in the set of servers based in part on deactivation of one or more of the servers in the cluster.

23. The computer system of claim 19 wherein the parameter data for each of the plurality of other servers identifies one or more applications installed in the respective other server, and the program instructions configure the load balancing algorithm to dispatch client requests to each of the plurality of other servers based on identities of applications installed in the respective other server.

24. The computer system of claim 23 wherein the parameter data for a first one of the plurality of other servers identifies a first application but not a second application installed in the first other server, and the parameter data for a second one of the plurality of other servers identifies the second application but not the first application installed in the second other server, and based on the parameter data for the first and second other servers, the load balancing algorithm dispatches requests for the first application to the first other server but not the second other server and dispatches requests for the second application to the second other server but not the first other server.

25. The computer system of claim 19 wherein the parameter data for each of the plurality of other servers identifies a first address of health information for a first one of the other servers, and a second address of health information for a second one of the other servers, and based on the parameter data for the first and second other servers, the program instructions configure the load balancing algorithm to check the health of the first and second other servers at the first and second addresses, respectively.

26. The computer system of claim 19 further comprising:
program instructions, stored on at least one of the one or more storage devices for execution by at least one of the one or more processors via at least one of the one or more memories, to make an electronic record that the plurality of other servers are candidates to add to the cluster and including in the electronic record respective network addresses of the plurality of other servers; and
program instructions, stored on at least one of the one or more storage devices for execution by at least one of the one or more processors via at least one of the one or more memories, to identify the plurality of other servers and the addresses of the plurality of other servers from the electronic record to determine which servers to poll and the respective addresses of the servers to poll by the program instructions that individually poll each of the plurality of other servers.

27. The computer system of claim 10 wherein the program instructions are installed in a load balancer.

* * * * *